April 18, 1950 C. E. BARCLAY 2,504,244
MEASURING INSTRUMENT
Filed Aug. 7, 1946 2 Sheets-Sheet 1
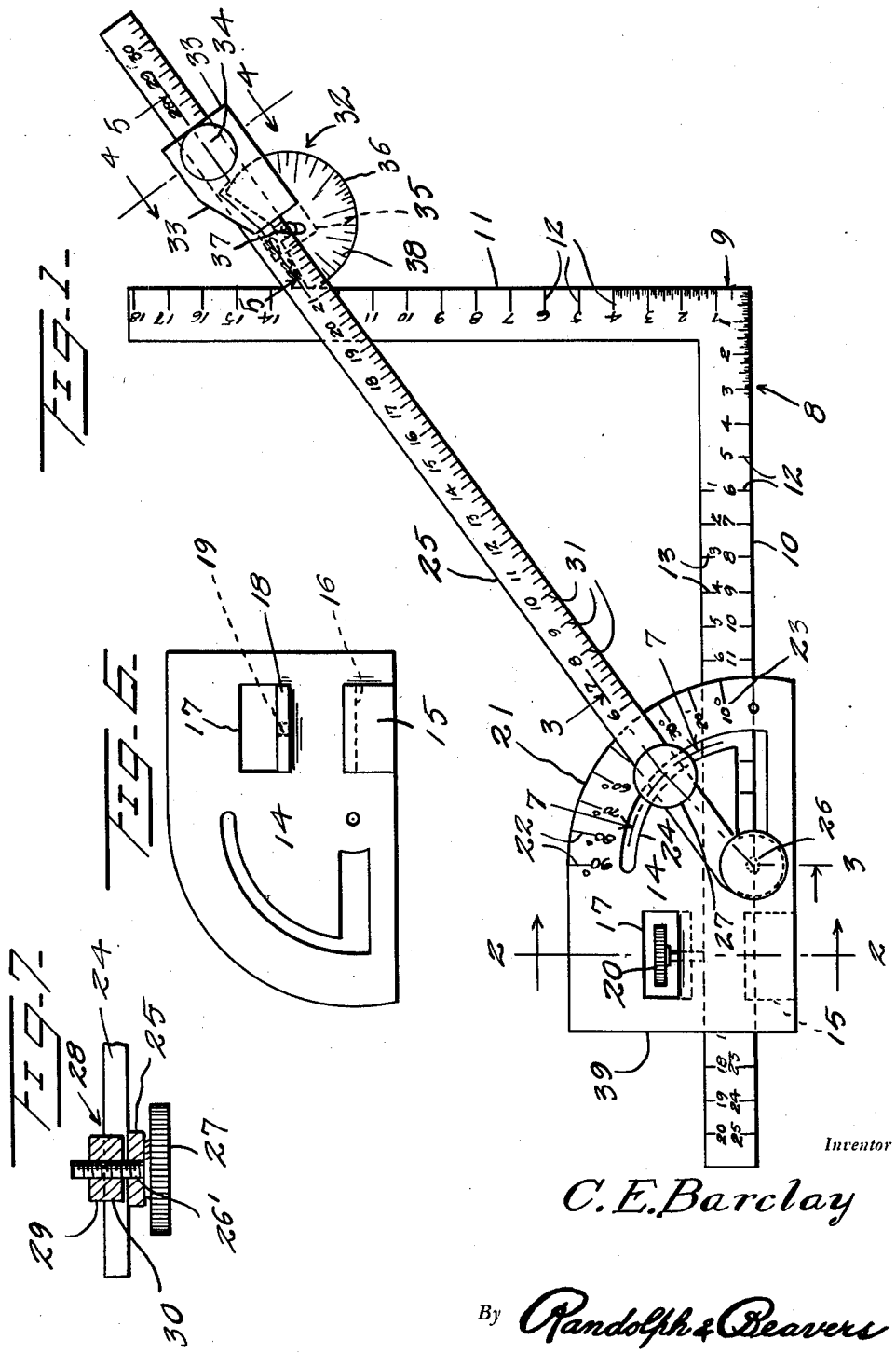

April 18, 1950  C. E. BARCLAY  2,504,244
MEASURING INSTRUMENT
Filed Aug. 7, 1946  2 Sheets-Sheet 2
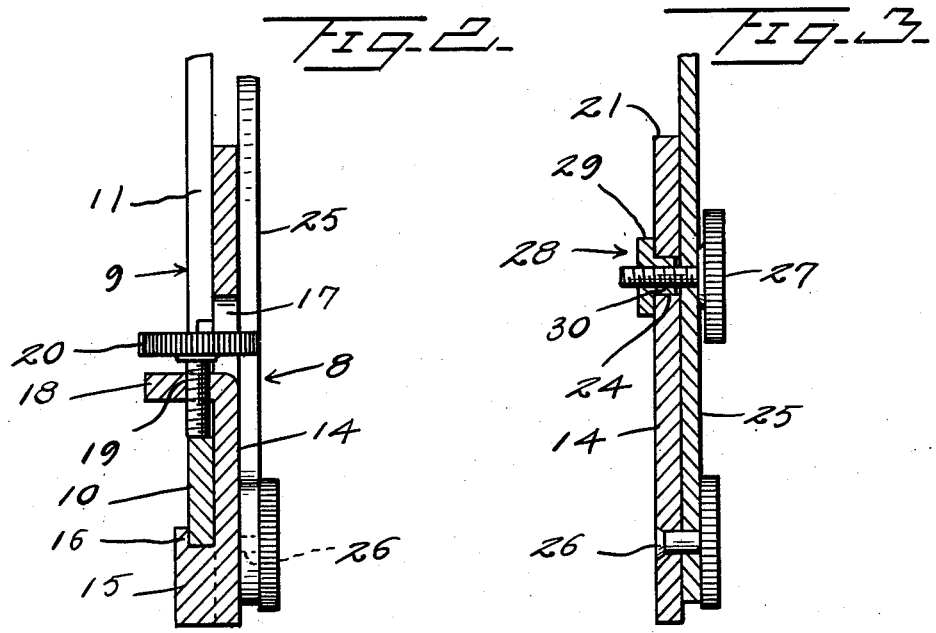
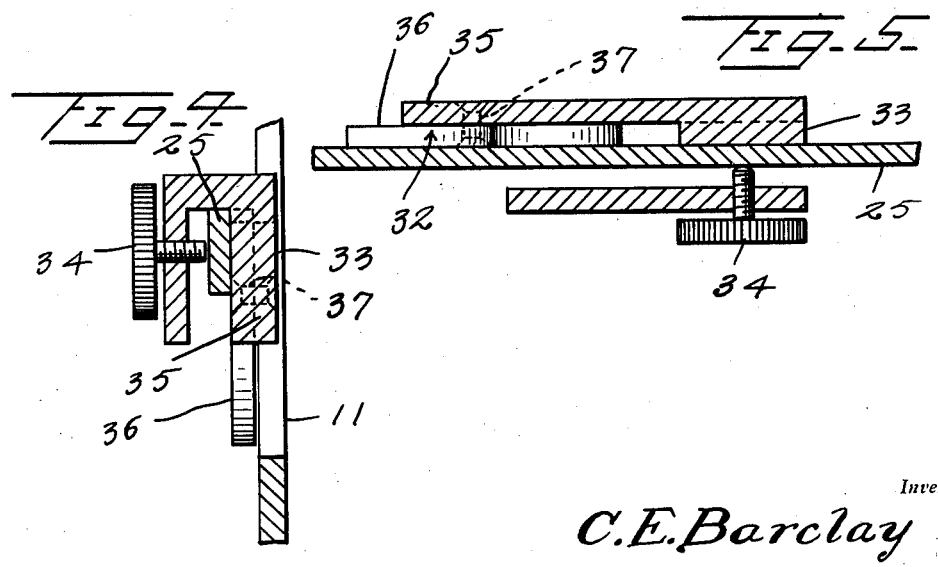
Inventor
C. E. Barclay
By Randolph & Beavers
Attorneys Patented Apr. 18, 1950

2,504,244

UNITED STATES PATENT OFFICE 2,504,244

MEASURING INSTRUMENT

Charles E. Barclay, Philomath, Oreg.

Application August 7, 1946, Serial No. 688,835

2 Claims. (Cl. 33—94)

This invention relates to a measuring instrument especially adapted for use by carpenters in lay-out work and which can be accurately employed for measuring the hypotenuse of a right angle triangle both as to degree and length.

More particularly, it is an aim of the invention to provide a measuring instrument which is especially useful in laying out length and miter cuts for complicated roofs, rafters, braces and stair runs and which will save considerable time in lay-out work and eliminates the necessity of making scale drawings to ascertain degree and linear measurements.

Still a further aim of the invention is to provide an instrument which is relatively small in size as compared to a common square and as compared to the actual size of rafters, braces and stair runs but which is provided with means for obtaining fine linear measurements thereon, so that by measurements obtained with the instrument the lay-out work will be extremely accurate when utilized in the actual construction work.

Numerous other objects and advantages of the instrument will hereinafter become more fully apparent from the following description of the drawings, which illustrate a preferred embodiment thereof, and wherein:

Figure 1 is a top plan view of the measuring instrument;

Figure 2 is a cross sectional view thereof, on an enlarged scale, taken substantially along a plane as indicated by the line 2—2 of Figure 1;

Figure 3 is a similar view taken substantially along a plane as indicated by the line 3—3 of Figure 1;

Figure 4 is a cross sectional view taken substantially along a plane as indicated by the line 4—4 of Figure 1, and on an enlarged scale;

Figure 5 is an enlarged longitudinal sectional view taken substantially along a plane as indicated by the line 5—5 of Figure 1;

Figure 6 is a plan view of one part of the instrument and looking toward the opposite side thereof to that as seen in Figure 1, and Figure 7 is a cross sectional view taken substantially along a plane as indicated by the line 7—7 of Figure 1.

Referring more specifically to the drawings, the improved lay-out or measuring instrument in its entirety is designated generally 8 and includes a square 9 composed of a blade 10 and tongue 11. The square 9 is one-quarter of the size of a common square and the blade 10 and tongue 11 are provided with graduation markings 12 on the upper side thereof and which extend inwardly from the outer edges of the parts 10 and 11. Certain of the correspondingly spaced graduation markings of the parts 10 and 11 are numbered consecutively beginning "1," "2" etc. beginning from the apex of the square 8. The space or distance between the adjacent numbered markings 12 is in each case equal to one-quarter of an inch. The blade 10 is also provided with graduation markings 13 along a portion of the inner edge thereof and on the upper side of the blade and said markings are likewise numbered consecutively toward the outer end of the blade 10 and beginning "1," "2" etc. As clearly illustrated in Figure 1, the graduation 13 which is transversely aligned with the graduation 12 numbered "6" bears the number "1." It will thus be apparent that the numbering of the graduations 12 and 13 differ by five-quarters of an inch, for a purpose which will hereinafter become apparent.

A plate 14 is disposed against the upper side of the blade 10 and lengthwise thereof and is mounted for sliding movement lengthwise of said blade. The plate 14 is provided with a rearwardly projecting shoulder 15 having an upwardly opening groove 16 in the inner part thereof to slidably engage the outer edge of the blade 10, as best seen in Figure 2. Above the shoulder 15, the plate 14 is provided with a struck-out portion forming an opening 17 and said struck-out portion extends rearwardly and is disposed above the shoulder 15 to provide a flange 18 which is located inwardly of the inner edge of the blade 10, when the outer edge of said blade is in engagement with the groove or channel 16. The flange 18 is provided with a threaded opening 19 to receive a thumb screw 20, the head of which is partially disposed in the opening 17, and the terminal of the shank end of which is adapted to be moved into and out of engagement with the inner edge of the blade 10 to clamp or release the plate 14 relatively to said blade.

The plate 14 is provided with an arcuate inner edge 21 and the upper side or outer side of the plate 14 is provided with radially disposed graduation markings 22 which extend inwardly from the edge 21 and which are indicated by degree markings 23 at ten degree intervals from "0" to "90" degrees. The plate 14 is provided with an arcuate slot 24 which is disposed concentric with the edge 21 and over which a protractor arm 25 is swingably disposed on a pivot 26 of the plate 14, the axis of which intersects with the outer edge of the blade 10. As best seen in Figure 7, the arm 25 is provided with an opening 26' to receive the threaded shank of a thumb screw 27 which engages the threaded bore of a nut 28. The nut 28 is provided with an enlarged outer portion 29 which engages the rear side of the plate 14, and a restricted inner portion 30 which slidably engages the groove 24, so that by tightening the thumb screw 27 the portion 29 will coact with the screw 27 to clamp the arm 25 against the plate 14 and prevent swinging movement thereof on its pivot 26.

The upper outer side of the protractor arm 25 is provided with scale markings or graduations 31 which project from the inner edge thereof and corresponding graduations of which are numbered consecutively beginning with "6" from adjacent the inner toward the outer end of the arm 25, and which numbered graduations 31 are spaced the same distances apart as the numbered graduations 12 and 13. As clearly illustrated in Figure 1, the inner edge of the protractor arm 25 intersects the axis of the pivot 26.

A micrometer or vernier, designated generally 32 is slidably mounted on the arm 25 and includes a slide 33 which slidably engages the arm 25 and which is provided with a set screw 34 which is adjustable for clamping the slide to the arm 25 at any desired position thereon. The slide 33 includes the inwardly projecting extension 35 which is disposed beneath the arm 25 and to which a disk segment 36 is rotatably connected. The disk segment 36 is disposed between the extension 35 and the arm 25 and the axis of the pivot 37 thereof is one thirty-second of an inch off center with respect to diametrically opposed edge portions of the disk segment 36. The diameter of the disk segment 36 is equal to one inch so that by rotating said disk segment 36 through an arc of 180 degrees the edge of the disk 36 will be displaced with respect to the arm 25 a distance equal to one-sixteenth of an inch. The upper surface of the disk 36 is provided with graduations 38 which extend inwardly from the arcuate edge thereof, which cover an area equal to 180 degrees thereon and of which there are twenty-four.

The distance between the outer edge 39 of the plate 14 and the axis of the pivot 26 is equal to one and one-quarter inches so that by using the edge 39 as an index line with the scale or graduations 13, it is possible to accurately read the distance that the pivot 26 is spaced from the inner end of the blade 10. For example, as seen in Figure 1, the edge 39 is located substantially on the graduation "17" of the scale 13 so that the pivot 26 is located in the same respect to the graduation "17," not visible, of the scale or graduations 12.

Assuming that it is desired to obtain angle and length of the hypotenuse of a right angle triangle having a base side equal to seventeen feet, a perpendicular side equal to twelve and one-quarter feet, the measuring instrument 8 would be set as illustrated in Figure 1. The instrument 8 is constructed in scale and one inch thereon equals four feet on a rafter, brace etc. Consequently, the space between adjacent graduations marked "1," "2" etc., are equivalent to one foot on a brace or rafter. As previously explained, the axis of the pivot 26 is located on the graduation "17" of the scale 12. The inner edge of the protractor arm 25 intersects the outer edge of the scale 12 of the tongue 11 at "12¼." The inner edge of the arm 25 is equally disposed between a "30 degree" and "40 degree" graduation 22 of the protractor 21 so that the angle of the hypotenuse desired is 35 degrees. The length of the hypotenuse as measured on the scale 31 is between 21 and 21¼ feet. As this measurement is not as accurate as is desired, the micrometer or vernier 32 is adjusted so that the base line of the graduations 38 thereof is on the "21¼" graduation of the scale 31. The disk 36 is then revolved in a clockwise direction until its arcuate edge intersects with the inner edge of the arm 25 and the outer edge of the tongue 11. As there are twenty-four graduations 38 on the disk 36, the space between any two graduations represents one-eighth of an inch on the brace or rafter so that, for example, if the disk 36 was rotated 120 degrees or 16 graduations before its arcuate edge intersected with the tongue and the arm edges, the exact distance measured on the arm 25 would be twenty-one feet one inch.

Various modifications and changes are contemplated and may obviously be resorted to, without departing from the spirit and scope of the invention as hereinafter defined by the appended claims.

I claim:

1. In a measuring or lay-out instrument, a protractor adapted to be slidably mounted on the blade of a square, a protractor arm pivotally mounted on the protractor and projecting therefrom and intersecting with the tongue of the square and having an inner edge disposed in a plane to intersect with the axis of its pivot for measuring the angle of the hypotenuse of a right angle triangle on the protractor, said protractor arm being provided with linear graduations, scaled to correspond to the scale of the graduations of the square, and a vernier or micrometer adjustably carried by the protractor arm including a slide for slidably engaging the protractor arm and a disk segment eccentrically journaled on the slide and having graduations to function in conjunction with the protractor arm and with an edge of the tongue of the square for obtaining fine measurements on the linear scale of the protractor arm.

2. A measuring instrument as in claim 1, said disk segment being eccentrically mounted for rotation relatively to the protractor arm whereby the graduated edge thereof will be displaced relatively to a predetermined point on said protractor arm when the disk is revolved.

CHARLES E. BARCLAY.

REFERENCES CITED

The following references are of record in the file of this patent:

UNITED STATES PATENTS

| Number | Name | Date |
|---|---|---|
| 302,767 | Olson et al. | July 29, 1884 |
| 452,054 | Sperry | May 12, 1891 |
| 503,050 | Lantz | Aug. 8, 1893 |
| 579,952 | Campbell | Apr. 6, 1897 |
| 634,782 | Walter | Oct. 10, 1899 |
| 820,311 | Oehrle | May 8, 1906 |
| 839,943 | Marsh | Jan. 1, 1907 |
| 1,024,863 | Myers | Apr. 30, 1912 |
| 1,104,123 | Lewis | July 21, 1914 |
| 1,110,968 | Southard | Sept 15, 1914 |
| 1,424,492 | Leschen | Aug. 1, 1922 |

FOREIGN PATENTS

| Number | Country | Date |
|---|---|---|
| 109,044 | Germany | Apr. 8, 1899 |